(12) United States Patent
Paar et al.

(10) Patent No.: US 10,450,183 B2
(45) Date of Patent: Oct. 22, 2019

(54) FLUID MANAGEMENT CONTROLLER

(71) Applicant: Graco Minnesota, Inc., Minneapolis, MN (US)

(72) Inventors: Benjamin J. Paar, Minneapolis, MN (US); Bradley G. Kahler, Otsego, MN (US); Chad G. Igo, Coon Rapids, MN (US); Gregory D. Sleckert, Plymouth, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 15/928,782

(22) Filed: Mar. 22, 2018

(65) Prior Publication Data

US 2019/0100425 A1    Apr. 4, 2019

Related U.S. Application Data

(60) Provisional application No. 62/567,035, filed on Oct. 2, 2017.

(51) Int. Cl.
*G05D 11/00* (2006.01)
*G05D 7/00* (2006.01)
(Continued)

(52) U.S. Cl.
CPC .............. *B67D 7/145* (2013.01); *B67D 7/08* (2013.01); *B67D 7/14* (2013.01); *B67D 7/16* (2013.01);
(Continued)

(58) Field of Classification Search
CPC ... B67D 7/08; B67D 7/16; B67D 7/32; B67D 7/34
(Continued)

(56) References Cited

U.S. PATENT DOCUMENTS 4,469,149 A    9/1984  Walkey et al.
5,923,572 A    7/1999  Pollock
(Continued)

FOREIGN PATENT DOCUMENTS

JP    H08301396 A    11/1996
KR    20100068137 A    6/2010
(Continued)

OTHER PUBLICATIONS

International Search Report and Written Opinion of PCT International Application No. PCT/US2018/23861, 11 pages, dated Jul. 10, 2018.
(Continued)

*Primary Examiner* — Md Azad
(74) *Attorney, Agent, or Firm* — Kinney & Lange, P.A.

(57) ABSTRACT

A fluid management controller includes a processor, a wireless interface, and a memory. The wireless interface is configured to communicate between the processor and one or more fluid management components. The processor is configured to authorize control of the one or more fluid management components over the wireless interface. The memory is encoded with instructions that, when executed by the processor, cause the processor to provide dispense authorizations to the one or more fluid management components and record fluid dispense information from the one or more fluid management components in the memory.

17 Claims, 7 Drawing Sheets

(51) Int. Cl.
- *B67D 7/14* (2010.01)
- *B67D 7/08* (2010.01)
- *B67D 7/16* (2010.01)
- *B67D 7/32* (2010.01)
- *B67D 7/34* (2010.01)
- *B67D 7/30* (2010.01)

(52) U.S. Cl.
CPC ............... *B67D 7/302* (2013.01); *B67D 7/32* (2013.01); *B67D 7/34* (2013.01)

(58) Field of Classification Search
USPC .......................................................... 700/283
See application file for complete search history.

(56) References Cited

U.S. PATENT DOCUMENTS

| | | | |
|---|---|---|---|
| 6,571,151 B1* | 5/2003 | Leatherman | B67D 7/145 |
| | | | 141/94 |
| 6,585,009 B2 | 7/2003 | Matthews et al. | |
| 6,659,306 B2 | 12/2003 | Boyle et al. | |
| 7,082,969 B1 | 8/2006 | Hollerback | |
| 7,096,894 B1 | 8/2006 | Hollub et al. | |
| 7,551,087 B2 | 6/2009 | McAllister | |
| 7,647,954 B2 | 1/2010 | Garber et al. | |
| 7,778,600 B2 | 8/2010 | Godwin et al. | |
| 8,037,844 B2 | 10/2011 | Mather et al. | |
| 8,429,095 B1 | 4/2013 | Ryan | |
| 8,816,860 B2 | 8/2014 | Ophardt et al. | |
| 8,833,607 B2 | 9/2014 | Wegelin et al. | |
| 8,994,529 B2 | 3/2015 | White | |
| 9,053,503 B2 | 6/2015 | Carapelli | |
| 9,227,209 B2 | 1/2016 | Mather et al. | |
| 9,516,141 B2 | 12/2016 | Dubois et al. | |
| 9,558,486 B2 | 1/2017 | Betancourt | |
| 9,649,651 B2 | 5/2017 | Mather et al. | |
| 9,715,682 B2 | 7/2017 | Webb et al. | |
| 2002/0188382 A1* | 12/2002 | Sherwood | G05D 7/0635 |
| | | | 700/282 |
| 2006/0121844 A1 | 6/2006 | Sparks, II | |
| 2006/0139169 A1 | 6/2006 | Reid et al. | |
| 2006/0157149 A1* | 7/2006 | Hillam | B67D 7/222 |
| | | | 141/198 |
| 2007/0056983 A1 | 3/2007 | Wells | |
| 2009/0314797 A1 | 12/2009 | Breeser | |
| 2010/0200609 A1 | 8/2010 | Cadigan | |
| 2011/0166689 A1 | 7/2011 | Alden et al. | |
| 2011/0172816 A1 | 7/2011 | Ezra | |
| 2011/0245983 A1 | 10/2011 | Beebe | |
| 2013/0103585 A1 | 4/2013 | Carapelli | |
| 2013/0206279 A1* | 8/2013 | Ryan | B67D 7/145 |
| | | | 141/94 |
| 2015/0120476 A1* | 4/2015 | Harrell | G06Q 20/202 |
| | | | 705/21 |
| 2015/0161590 A1 | 6/2015 | Genovez | |
| 2015/0375984 A1 | 12/2015 | Arcand | |
| 2016/0121352 A1 | 5/2016 | Mather et al. | |
| 2017/0109722 A1 | 4/2017 | Morris et al. | |
| 2017/0178257 A1 | 6/2017 | Tingler et al. | |
| 2017/0221116 A1 | 8/2017 | Makke et al. | |
| 2017/0247241 A1* | 8/2017 | Blyth | B67D 7/145 |

FOREIGN PATENT DOCUMENTS

| | | |
|---|---|---|
| WO | WO2005045536 A2 | 5/2005 |
| WO | WO2015066193 A1 | 5/2015 |

OTHER PUBLICATIONS

Third Party Observation from PCT Application No. PCT/US2018/023861, dated Feb. 4, 2019, pp. 2.

International Search Report and Written Opinion for PCT Application No. PCT/US2018/023858, dated Jul. 9, 2018, pp. 16.

International Search Report and Written Opinion for PCT Application No. PCT/US2018/055237, dated Jan. 28, 2019, pp. 12.

* cited by examiner

FLUID MANAGEMENT CONTROLLER

CROSS-REFERENCE TO RELATED APPLCATION(S)

This application claims the benefit of U.S. Provisional Application No. 62/567,035, filed Oct. 2, 2017, and entitled "FLUID MANAGEMENT CONTROLLER," the disclosure of which is hereby incorporated by reference in its entirety.

BACKGROUND

The present disclosure relates to fluid dispensing. More particularly, this disclosure relates to independent control of a fluid management system by a fluid management controller.

Fluid management has become increasingly important to control the costs of fluid overhead. For example, many vehicle fleet managers and auto dealerships have installed fluid management systems to efficiently dispense fluids, such as motor oil and transmission fluid. Such fluid management systems frequently include a fluid tank and a pump located away from a dispensing point. Fluid management systems can include wireless transmission and reception of meter and tank level information to make it simple to track the fluid dispensing of an entire facility. Fluid management systems can also include an authorization control that prevents fluid dispensing without prior authorization.

Fluid management systems typically include a pump control and a dispensing point, such as a dispense meter. The software controlling the fluid management system may be operated from a personal computer ("PC") or other computing platform. The PC can be located near the fluid dispensing point, such as at a vehicle technician work station, for example, or in various other locations. The PC may be configured to communicate, and in many cases, control at least one other component in the fluid management system, such as the dispense meter, the pump control, and/or a tank monitor. The PC may also be configured to collect, aggregate, analyze, and report fluid usage and statistics. The PC may also include a transceiver configured to communicate with the fluid management system hardware through a wireless network.

PC-based software for a fluid management system relies upon both the operating system of the PC and the communication hardware and software of the PC. If either the operating system or hardware of the PC is not operating properly, the fluid management software will not function. Updates to firewall security on the PC can prevent the fluid management software operating on the PC from connecting with the fluid management hardware, such as the fluid management pump or dispensing meter. Patches or updates to the PC operating system, fleet management system, or dealership management system, or an entirely new version of an operating system, can also affect the operation of the fluid management software and communication between the fluid management software and the fluid management hardware, and can prevent integration of the fluid management software and the fleet management software.

SUMMARY

According to one aspect of the disclosure, a fluid management system includes at least one fluid management component; a user interface device; and a fluid management controller configured to communicate wirelessly with the at least one fluid management component, authorize the at least one fluid management component to initiate a dispense event, and collect data received from the at least one fluid management component.

According to another aspect of the disclosure, a method includes authorizing, by a fluid management controller, a first dispense event; collecting, by the fluid management controller, first fluid data regarding the first dispense event from at least one fluid management component, wherein the fluid management controller is configured to communicate wirelessly with the at least one fluid management component; and providing access, by the fluid management controller, to the first fluid data by a user interface device.

According to yet another aspect of the disclosure, a fluid management controller includes a processor; a wireless transceiver configured to enable wireless communication between the fluid management controller and one or more fluid management components; and a computer readable memory encoded with instructions that, when executed by the processor, cause the fluid management controller to authorize the at least one fluid management component to initiate a dispense event, and collect data received from the at least one fluid management component.

DETAILED DESCRIPTION

Figure 1:
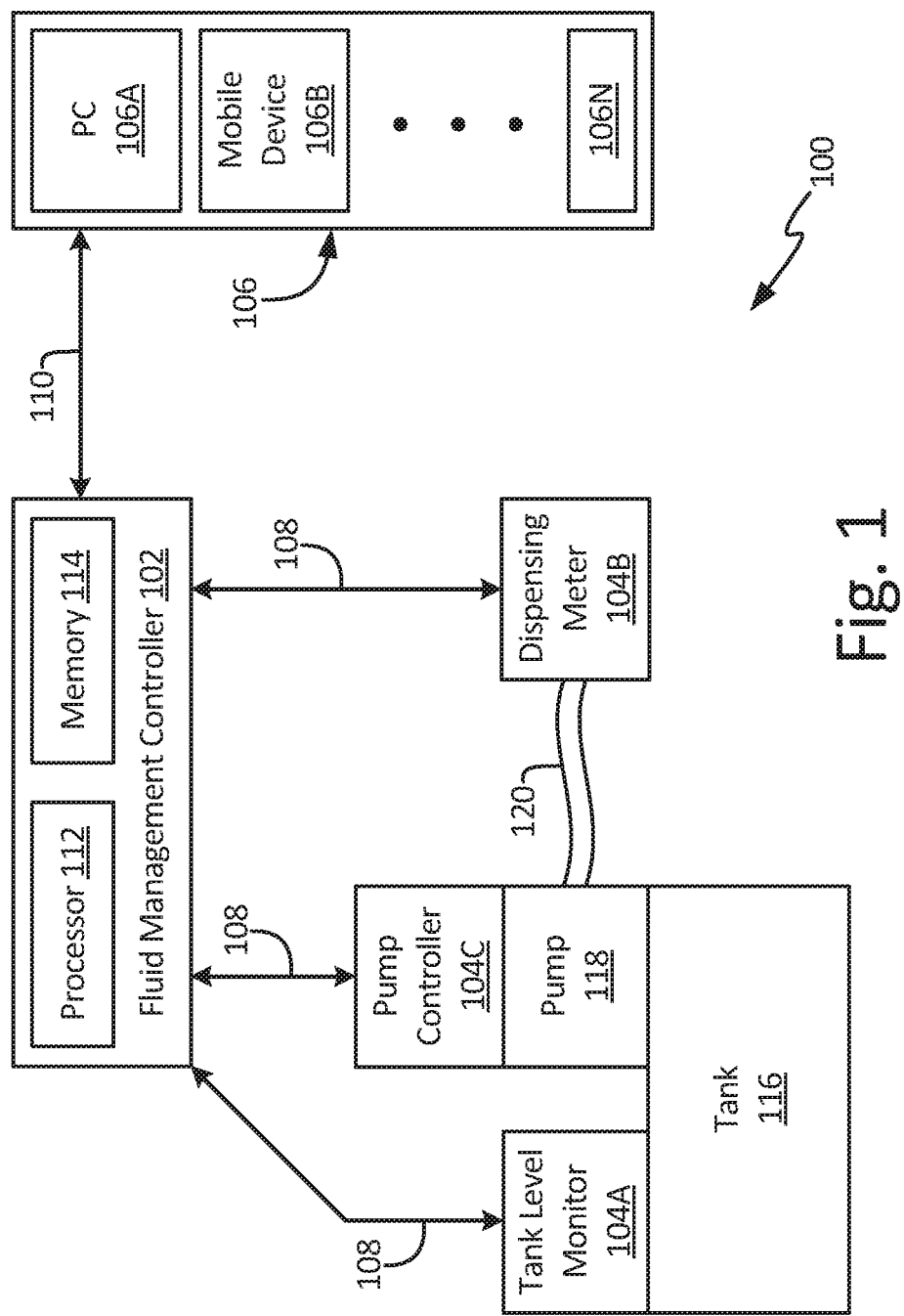
FIG. 1 is a block diagram of a fluid management system.

FIG. 1 is a schematic block diagram of fluid management system 100. Fluid management system 100 includes fluid management controller 102, fluid management components 104A-C (collectively herein "fluid management components 104"), user interface devices 106A-N (collectively herein "user interface devices 106"), communication links 108 and 110, tank 116, pump 118, and supply hose 120. Fluid management controller 102 includes processor 112 and memory 114. Fluid management components 104 include tank level monitor 104A, dispensing meter 104B, and pump controller 104C. User interface devices 106 include any suitable processor-based devices for communicating with fluid management controller 102, such as personal computer (PC) 106A, mobile device 106B, and other mobile communication devices and organizer devices 106N. PC 106A can be a desktop, laptop, personal digital assistant, table computer, or other such device. Mobile device 106B can be a smartphone, tablet, or other such device.

Fluid management system 100 is a system for dispensing fluid and tracking fluid dispenses. For example, fluid management system 100 can be implemented in an automotive shop to dispense and track oil, coolant, and other automotive fluid dispenses. Tank level monitor 104A is attached to tank 116 and, in some examples, can extend into tank 116. Tank level monitor 104A senses fluid level in tank 116 and is configured to communicate the tank level information to fluid management controller 102 over communication link 108. Pump 118 is configured to drive fluid downstream from tank 116 to dispensing meter 104B through supply hose 120. Pump controller 104C is connected to pump 118 and controls the activation of pump 118. In some examples, pump controller 104C is located remotely from tank 116 and pump 118. For example, where pump 118 is a pneumatic pump, pump controller 104C can be an air control unit configured to control the air supply to pump 118 and/or pressurization to tank 116 to prevent unauthorized dispenses and spills.

Fluid management controller 102 communicates with fluid management components 104 via communication links 108. Communication links 108 can be individual connections, grouped connections, or a combination thereof. At least one of communication links 108 is a wireless connection. While illustrated in FIG. 1 as multiple communication links 108, in some examples, fluid management components 104 can communicate with fluid management controller 102 over a common communication network. In some examples, communication links 108 can be wireless communication links. For example, fluid management controller 102 can host a wireless personal area network (PAN) that includes fluid management components 104. It is understood, however, that while fluid management controller 102 can host a wireless PAN and communicate over the wireless PAN the communications can also be sent over an existing network, such as a local intranet and/or the Internet.

Fluid management controller 102 communicates with user interface devices 106 via communication link 110, which can be a wired or wireless connection. In some examples, communication link 110 can be part of the same network as communication links 108, or can be a direct connection such as an Ethernet connection. In one example, both communication links 108 and communication links 110 can be part of the wireless PAN hosted by fluid management controller 102.

Fluid management controller includes processor 112 and memory 114. In some examples, processor 112 and memory 114 are disposed on the same circuit board, such that fluid management controller 102 is a single-board computer ("SBC"). In other examples, memory 114 may be an external memory device such as external hard drive, flash drive, memory card, or other such device. Processor 112 is configured to implement functionality and/or process instructions. For instance, processor 112 can be capable of processing instructions stored in memory 114. Examples of processor 112 can include any one or more of a microprocessor, a controller, a digital signal processor (DSP), an application specific integrated circuit (ASIC), a field-programmable gate array (FPGA), or other equivalent discrete or integrated logic circuitry.

Memory 114, in some examples, can be configured to store information during operation. Memory 114, in some examples, is described as a computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in random access memory (RAM) or cache). In some examples, memory 114 is a temporary memory, meaning that a primary purpose of memory 114 is not long-term storage. Memory 114, in some examples, is described as volatile memory, meaning that memory 114 does not maintain stored contents when power to fluid management controller 102 is turned off. Examples of volatile memories can include random access memories (RAM), dynamic random access memories (DRAM), static random access memories (SRAM), and other forms of volatile memories. In some examples, memory 114 is used to store program instructions for execution by processor 112. Memory 114, in one example, is used by software or applications running on fluid management controller 102 to temporarily store information during program execution.

Memory 114, in some examples, also includes one or more computer-readable storage media. Memory 114 can be configured to store larger amounts of information than volatile memory. Memory 114 can further be configured for long-term storage of information. In some examples, memory 114 includes non-volatile storage elements such as read only memory (ROM). Examples of such non-volatile storage elements can include magnetic hard discs, optical discs, floppy discs, flash memories, or forms of electrically programmable memories (EPROM) or electrically erasable and programmable (EEPROM) memories.

Fluid management controller 102 provides a central hub for data collection and processing for fluid management, tracking, and control in fluid dispense applications involving fluid management components 104. Fluid management controller 102 provides a closed system capable of independently tracking and controlling fluid dispenses within fluid management system 100. Fluid management components 104 sense the level of fluid in fluid management system 100, drive the fluid to dispense locations, dispense the fluid, sense the volume of fluid dispensed, and communicate the sensed information to fluid management controller 102.

Fluid management controller 102 communicates with fluid management components 104 to collect, aggregate, analyze, and report fluid usage and statistics. Tank level monitor 104A senses the volume of fluid in tank 116 and communicates the tank level information to fluid management controller 102 via communication link 108. Pump controller 104C communicates with fluid management controller 102 via communication link 108, and activates and deactivates pump controller 104C to activate and deactivate pump 118.

While activated, pump 118 draws fluid from tank 116 and drives the fluid downstream to dispensing meter 104B through supply hose 120. Dispensing meter 104B dispenses the fluid from tank 116 at a desired dispense location and senses the amount of the fluid dispensed. Fluid management controller 102 communicates with dispensing meter 104B via communication link 108. In one example, fluid management controller 102 receives work order information from dispensing meter 104B and is configured to authorize a dispense volume based on that work order information. With the dispense event authorized by fluid management controller 102, components within dispensing meter 104B activate dispensing meter 104B such that the user can dispense the fluid with dispensing meter 104B. Dispensing meter 104B dispenses the fluid up to the authorized dispense volume and communicates the volume of fluid dispensed to fluid management controller 102. The components in dispensing meter 104B deactivate dispensing meter 104B when the actual volume dispensed reaches the authorized dispense volume. Fluid management controller 102 tracks and records the volumes dispensed and associates that information with the work order. Fluid management controller 102 also records the dispense information and can aggregate data from multiple fluid dispense events for system-wide fluid tracking and management.

Memory 114 stores software that, when executed by processor 112, collects and sorts the information provided to fluid management controller 102 via communication links 108. Fluid management controller 102 stores the information from fluid management components 104 in memory 114. The information can include fluid management information such as customer job order information, fluid storage configurations, login information, fluid level information, the dispense volume for each fluid dispense event, and user information. The information can be sorted by user, work order, fluid type, volume, or any other parameter that is desired.

The information stored in memory 114 is accessible by user interface devices 106 via communication link 110. For example, user interface devices 106 can access fluid data from memory 114 via HTML webpages viewable in common browsers for user interface devices 106 via communication link 110. Fluid management controller 102 can provide the HTML code for user interface devices 106 to interface with fluid management controller 102. Additionally, the user can access and modify the operating parameters of fluid management system 100 by accessing fluid management controller 102 through the webpage generated and presented by fluid management controller 102.

By way of example, a fluid dispense event is discussed. A customer-specific work order is generated by a user using user interface device 106. The work order information is provided to fluid management controller 102 over communication link 110. The work order information can include, among others, the specific fluid to be dispensed, users authorized to make the dispense, the volume of fluid to be dispensed, and customer identifying information. Fluid management controller 102 stores the work order information in memory 114.

The user selects a dispensing meter 104B associated with the specific fluid specified in the work order. The user enters log-in information at dispensing meter 104B, such as a pin code or ID card. Fluid management controller 102 receives the log-in information from dispensing meter 104B over communication link 108 and associates the log-in information with the work order. The log-in information provides a security measure to prevent unauthorized users from dispensing fluid and to prevent the user from inadvertently dispensing an undesired fluid. Fluid management controller 102 authorizes the dispense event based on the work order information and the log-in information. In some examples, fluid management controller 102 saves the user information, time of login, and authorization status of the user in memory 114 for system-wide tracking and dispense event tracking.

Fluid management controller 102 controls activation of fluid management components 104 based on the work order information. For example, fluid management controller 102 can send a dispense authorization signal to dispensing meter 104B via communication link 108 to unlock a trigger of dispensing meter 104B. Fluid management controller 102 also sends a pump authorization signal to pump controller 104C to activate pump controller 104C via communication link 108. Pump controller 104C activates pump 118, and pump 118 draws fluid from tank 116 and drives the fluid downstream to dispensing meter 104B through supply hose 120. In one example, pump controller 104C provides pressurization only to tank 116 which is associated with the dispense event. Pump controller 104C can be further configured to provide pressurization for only as long as required to dispense the approved volume of fluid. The user dispenses the fluid with dispensing meter 104B, and dispensing meter 104B communicates relevant dispense information, such as the actual volume dispensed, to fluid management controller 102 via communication link 108.

Throughout the dispense event, tank level monitor 104A senses the fluid levels in tank 116 and communicates the tank level information to fluid management controller 102 via communication link 108. Fluid management controller 102 saves the fluid level information provided by tank level monitor 104A in memory 114. Fluid management controller 102 also saves the actual dispense volume sensed by dispensing meter 104B in memory 114. Fluid management controller 102 also saves pump information provided by pump controller 104C. When the user has completed the dispense event, such as when the actual volume dispensed reaches the authorized dispense volume, dispensing meter 104B deactivates based on that actual volume dispensed reaching the authorized dispense volume. Fluid management controller 102 sends a signal to pump controller 104C via communication link 108 to deactivate pump 118. The fluid dispense event is thus complete.

Fluid management controller 102 presents HTML code that the user can access through a web browser on user interface device 106 via communication link 110. The user can access the dispense information associated with a specific dispense event and/or can access system-wide fluid information via user interface device 106. For example, the user can open the web browser on mobile device 106B to access the website. Through the website, the user can access the information stored in memory 114 regarding the tank fluid levels, the login information, the temporal length of dispenses, the amount of fluid dispensed, the date and time of the dispense, or any other relevant fluid information gathered by fluid management controller 102 from fluid management components 104.

In some examples, fluid management controller 102 aggregates data from multiple fluid dispense events and can generate and send reports to the user based on the aggregated fluid information. In one example, fluid management controller 102 can include reporting parameters and can generate the reports based on the reporting parameters. The reporting parameters can be based on any desired parameter, such as the tank level information, temporal boundaries, the number of dispenses completed, and the total volume dispensed, among others. For example, where the reporting parameter is temporal in nature, fluid management controller 102 can provide system-wide reports daily, weekly, monthly, or based on any other temporal boundary set by the user. In examples where the reporting parameter is based on tank level information, fluid management controller 102 can provide the system-wide reports based on the fluid level in tank 116 reaching a resupply volume such that additional fluid is required in tank 116. In some examples, fluid management controller 102 is configured to take independent action based on the reporting parameter, such as by ordering additional fluid from a fluid supplier based on the tank level information reaching the resupply volume.

The user can further modify and change the settings of fluid management system 100 through the website via user interface devices 106. For example, the user can set or remove maximum dispensing limits, add or remove authorized users, set reporting parameters and/or make other such changes to fluid management system 100. Fluid management controller 102 provides independent operation and control of fluid management system 100.

Fluid management controller 102 provides significant advantages. Fluid management controller 102 communicates with fluid management components 104 and user interface devices 106 independently of other devices and management systems. As such, fluid management system 100 operates independent of a dedicated PC application, fleet management system, and/or dealership management system. No installation of an executable file or a PC application is required; only initial configuration and registration of fluid management controller 102 is required. Fluid management controller 102 can be configured to send reports to user interface devices 106 via communication link 110. Fluid management controller 102 is a closed system requiring no wired connections to dispense, monitor, or control fluid management components 104. Instead, fluid management controller 102 communicates wireles sly with fluid management components 104. In some examples, communication links 108 and 110 are part of a wireless network, such as a wireless PAN. Fluid management controller 102 can host a web application to communicate with user interface devices 106 using standard browser technology. The closed nature of fluid management controller 102 bypasses issues related to operating system updates, firewalls, and user error related to erroneous PC usage on traditional dedicated PC applications, fleet management systems, and/or dealership management systems.

Figure 2:
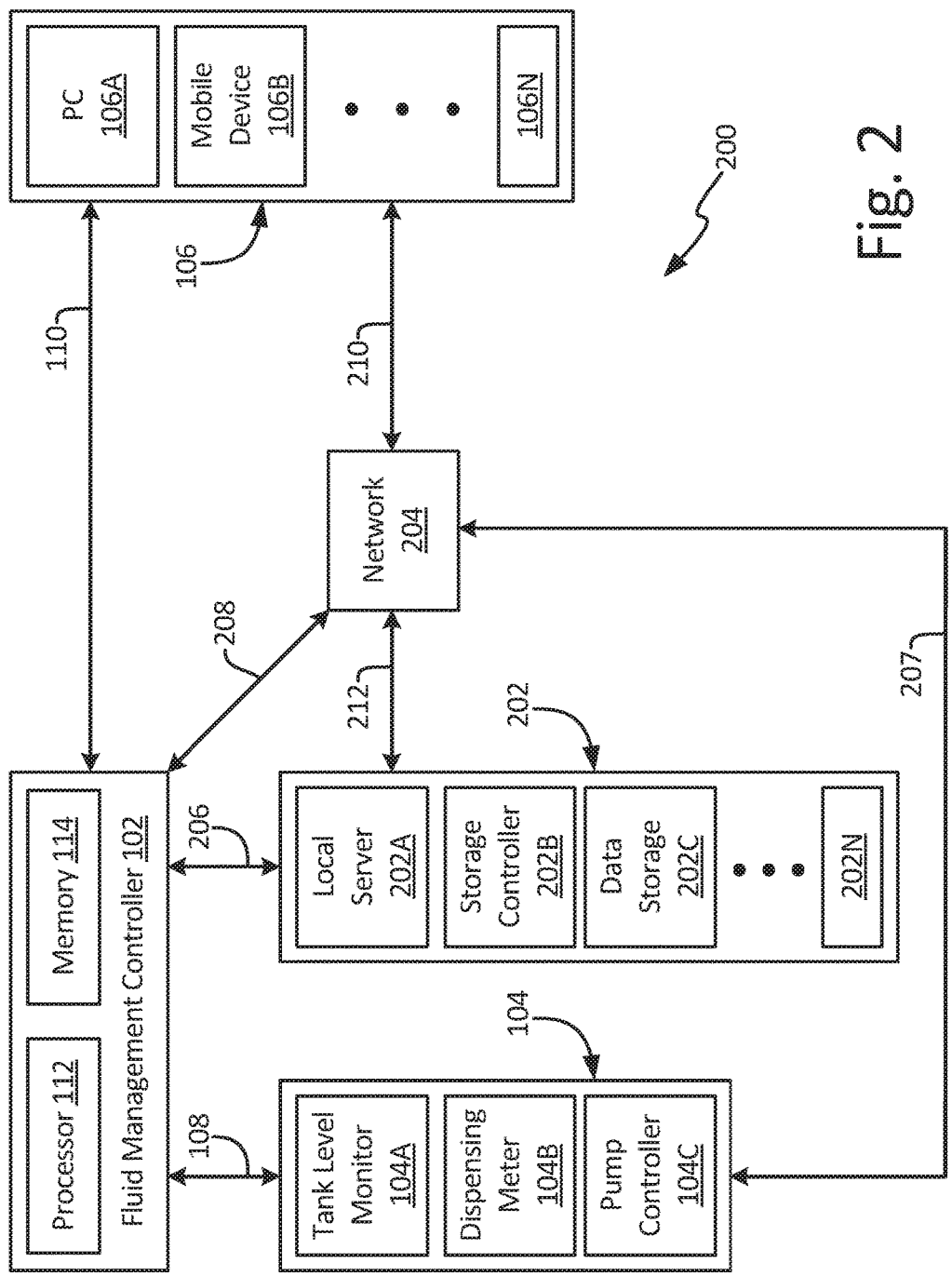
FIG. 2 is a block diagram of a fluid management system and a local management system.

FIG. 2 is a schematic block diagram of fluid management system 200 including local management system 202. Fluid management system 200 includes fluid management controller 102, fluid management components 104, user interface devices 106, local management system 202, network 204, and communication links 108, 110, 206, 207, 208, 210, and 212.

Fluid management controller 102 provides a central hub for data collection and processing for fluid management, tracking, and control in fluid dispense applications involving fluid management components 104. Fluid management components 104 monitor, sense, and distribute fluid throughout fluid management system 200. Fluid management controller 102 wireles sly communicates with fluid management components 104. Fluid management components 104 can communicate directly with fluid management controller 102 via communication link 108 and/or can communicate with fluid management controller 102 over network 204, via communication links 207 and 208.

Fluid management system 200 includes local management system 202, which is a local customer network, such as an intranet for an automotive shop. For example, local management system 202 can be a PC, fleet management system, dealership management system, commercial management system, or other such system. Local management system 202 includes local server 202A, storage controller 202B, and data storage device 202C. Storage controller 202B is configured to manage data communications between data storage 202C and other components of local management system 202. Local management system 202 can also include other components 202N that work to support local management functions, such as other aspects of a business. Communication link 206 is a direct connection between fluid management controller 102 and local management system 202. Communication links 108, 110, and 206 can be part of a network, such as a wireless personal area network (PAN), which, in some examples, can be hosted by fluid management controller 102.

Network 204 facilitates communications of data between fluid management controller 102 and local management system 202, user interface devices 106, and fluid management components 104. Network 204 includes communication links 207, 208, 210, and 212, and can be a local area network (LAN), a wide area network (WAN), a modem-to-modem connection, a cellular network, a combination of the above, or any other communications network now known or later developed within the networking arts which permits two or more computers to communicate, one with another.

The data communicated over network 204 can include, among others, fluid management information such as customer job order information, fluid storage configurations, fluid level information, the dispense volume for each fluid dispense event, and user information. User interface devices 106 connect to network 204 via communication link 210. Local management system 202 accesses network 204 via communication link 212. In one example, fluid management controller 102 can access local server 202A through an intermediate server (not shown). In a cloud application, for example, fluid management controller 102 can access an application server that fulfills requests from fluid management controller 102 by accessing a data management system. In one example, fluid management controller 102 executes a Java® application making requests to a JBoss® server executing on a Linux® server, which Linux® server fulfills the requests by accessing a relational database management system on a mainframe server. For example, the JBoss® server can receive customer information from a Java® application executing on mobile device 106B. The JBoss® server can retrieve customer vehicle service order information from local server 202A and determine if dispensing of at least one fluid has been authorized based on the work order information entered. Fluid management controller 102 can then authorize the fluid dispense event based on the information from the JBoss® server.

Memory 114 may store software that, when executed by processor 112, collects and sorts the information provided to fluid management controller 102 by fluid management components 104, user interface devices 106, and local management system 202. Fluid management controller 102 stores the information from fluid management components 104 in memory 114.

As discussed above, fluid management controller 102 authorizes, tracks, and records information from fluid management components 104 regarding discrete fluid dispense events. The information is stored in memory 114, and fluid management controller 102 can also present the information to local management system 202 for local storage, such as in data storage 202C. Fluid management controller 102 may also host web applications that allow users to access data via user interface devices 106. In some examples, the user can directly access the information on fluid management controller 102 via communication link 110. In other examples, the user can access the information over network 204. Additionally, the user can modify and change the operating parameters of fluid management controller 102 via user interface devices 106.

Network 204 can also allow user interface devices 106 to retrieve locally-stored information in local management system 202, such as via communication links 210 and 212, and in fluid management controller 102, such as via communication links 210 and 208. In one example, fluid management controller 102 can pull information from local management system 202 directly via communication link 206 and/or over network 204 via communication links 212 and 208. Fluid management controller 102 can communicate that information to user interface devices 106 over network 204 via communication links 208 and 210 and/or directly via communication link 110.

In another example, fluid management controller 102 provides data to local management system 202 via communication link 206, and local management system 202 can host webpage on local server 202A. User interface devices 106 can access the webpage by connecting to local management system 202 over network 204 through communication links 210 and 212.

During a dispense event, a customer-specific work order can be generated by the user at user interface device 106. The work order can also be generated directly in local management system 202. The work order can be communicated directly to fluid management controller 102 via communication link 110 or over network 204. The work order information can also be stored on data storage 202C and recalled by fluid management controller 102 directly, via communication link 206, or over network 204. In some examples, the work order information is also stored directly in memory 114. Fluid management controller 102 authorizes the dispense event based on the work order information input by the user. Fluid management controller 102 communicates the authorization to fluid management components 104 either directly via communication link 108, or over network 204 via communication links 208 and 207. With the dispense event authorized, the user is able to dispense the fluid with the fluid management components 104.

Fluid management controller 102 receives information regarding the dispense event, such as the type of fluid dispensed; the volume of fluid dispensed; the volume of fluid remaining in the tank, such as fluid tank 116; the length of the dispense event; and the identity of the user; among others, from fluid management components 104. Fluid management controller 102 can store the dispense information in memory 114 and/or communicate the information for storage in local management system 202, such as directly via communication link 206 or over communication links 208, 212 and network 204.

Fluid management controller 102 gathers the information regarding the discrete dispense event and generates reports that are accessible to the user via a website hosted by fluid management controller 102. The user opens the web browser on user interface device 106 and connects to fluid management controller 102 directly via communication link 110 or over network 204 via communication links 208 and 210. Network 204 can provide user access to fluid management controller 102 where communication link 110 is not available.

Fluid management controller 102 is configured to generate individual reports regarding the discrete dispense event as well as system-wide reports. The system-wide reports provide the user with information regarding fluid management system 200. In some examples, fluid management controller 102 is configured to automatically take action based on the system-wide report. For example, fluid management controller 102 can order additional fluid from a supplier where the tank level information provided by tank level monitor 104A indicates that the level of fluid has reached a resupply volume. Fluid management controller 102 can place orders over network 204.

The user can access the information stored in memory 114 via the website hosted by fluid management controller 102. Additionally, the user can modify and change the settings of fluid management system 200 via fluid management controller 102. For example, the user can set or remove maximum dispensing limits, modify authorized users, and/or implement other such changes to fluid management system 200. In this way, fluid management controller 102 controls and authorizes fluid dispenses and monitors fluid management system 200 independently of local management system 202. As such, fluid management system 102 allows the user to continue generating work orders and dispensing fluid even where local management system 202 is offline.

Fluid management system 200 provides significant advantages. Fluid management controller 102 communicates with fluid management components 104 and user interface device 106 independently of local management system 202. Fluid management controller 102 is a closed system requiring no wired communication connections to dispense, monitor, or control fluid management components 104. Instead, fluid management controller 102 can communicate with user interface devices 106 through an HTML interface viewable using standard browser technology through communication link 110 and/or over network 204 via communication links 208 and 210. No installation of an executable file or a PC application is required; only initial configuration and registration of fluid management controller 102 is required. The closed nature of the fluid management controller 102 bypasses issues related to operating system updates, firewalls, and user error related to erroneous PC usage on traditional local management systems 202.

Figure 3:
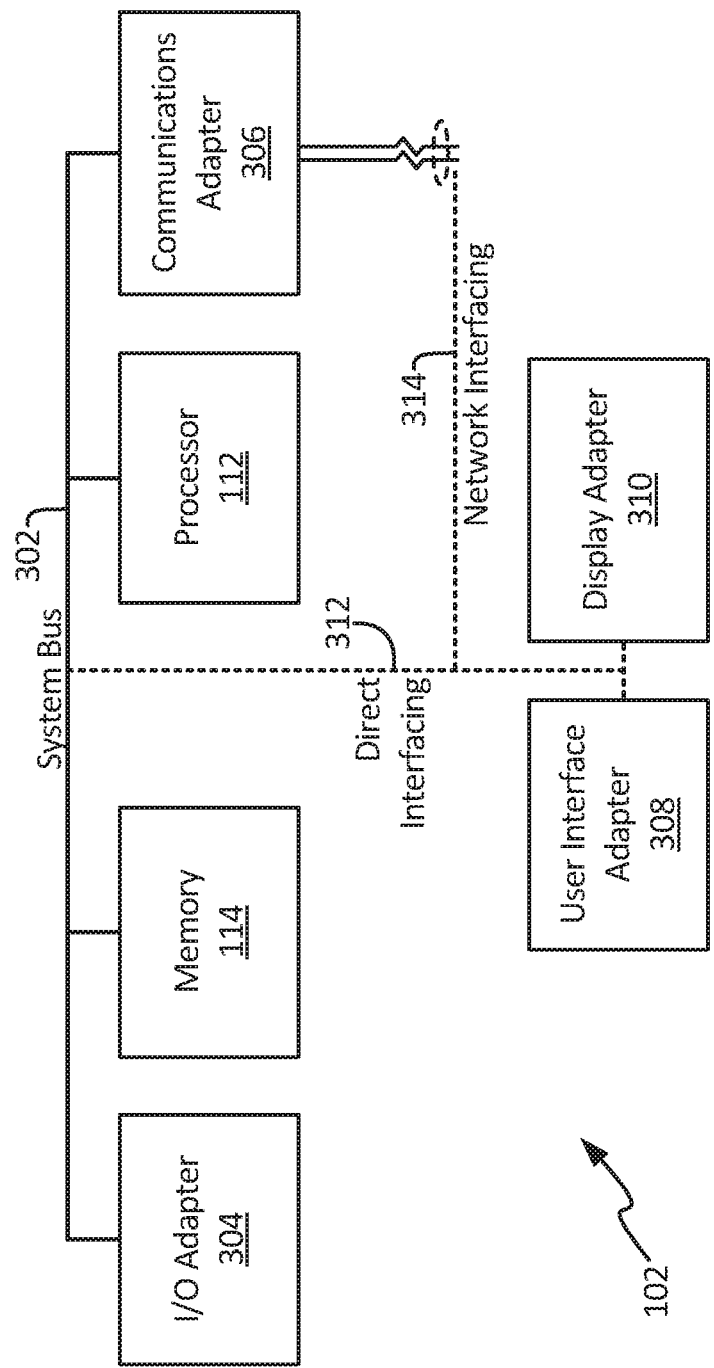
FIG. 3 is a block diagram of a fluid management controller.

FIG. 3 is a block diagram of fluid management controller 102. Fluid management controller 102 includes processor 112, memory 114, system bus 302, input/output (I/O) adapter 304, communications adaptor 306, user interface adapter 308, display adapter 310, direct interfacing 312, and network interfacing 314.

Processor 112, memory 114, I/O adapter 304, and communications adapter 306 can communicate with each other via system bus 302. User interface adapter 316 and display adapter 318 can connect to fluid management controller 102 via direct interfacing 312 and/or network interfacing 314. For example, direct interfacing 312 can include Ethernet, HDMI, or USB connections, for example. Network interfacing 314 can include wireless communications, such as via an HTML interface.

Memory 114 can include includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories. ROM can store configuration information for booting fluid management controller 102. Memory 114 can also include volatile memory, meaning that memory 114 does not maintain stored contents when power to fluid management controller 102 is turned off. Examples of volatile memories can include random access memories (RAM), dynamic random access memories (DRAM), static random access memories (SRAM), and other forms of volatile memories. Fluid management controller 102 can utilize RAM to store the various data structures used by a software application. RAM and ROM can store user and system data. Memory 114 can also include external storage devices. External storage devices can connect with fluid management controller 102 via I/O adapter 304.

Communications adapter 306 is configured to connect fluid management controller 102 to a network, such as network 204 (shown in FIG. 2). The network can be one or more of a LAN, WAN, and/or the Internet. Communications adapter 306 can further connect fluid management controller 102 to a storage device, such as data storage 202C (shown in FIG. 2).

User interface adapter 308 is configured to connect user input devices, such as a keyboard, mouse, touchscreen, or other similar input device to fluid management controller 102. Display adapter 310 is configured to connect to a display device, such as a monitor, to display information stored by fluid management controller 102. For example, a display connected through display adapter 310 may be configured to display a graphical user interface associated with a software or web-based application. In one example, menus allowing an administrator to input data on local server 202A through user interface adapter 308 may be displayed through display adapter 310.

While illustrated as a dedicated device 102, in other embodiments, fluid management controller 102 may be implemented on any suitable processor-based device including, without limitation, personal data assistants (PDAs), tablet computers, smartphones, computer game consoles, computer-on-module (COM), touch panel computers (TPC), and multiprocessor servers. Moreover, fluid management controller can be implemented using application specific integrated circuits (ASIC), very large scale integrated (VLSI) circuits, or other circuitry.

Figure 4A:
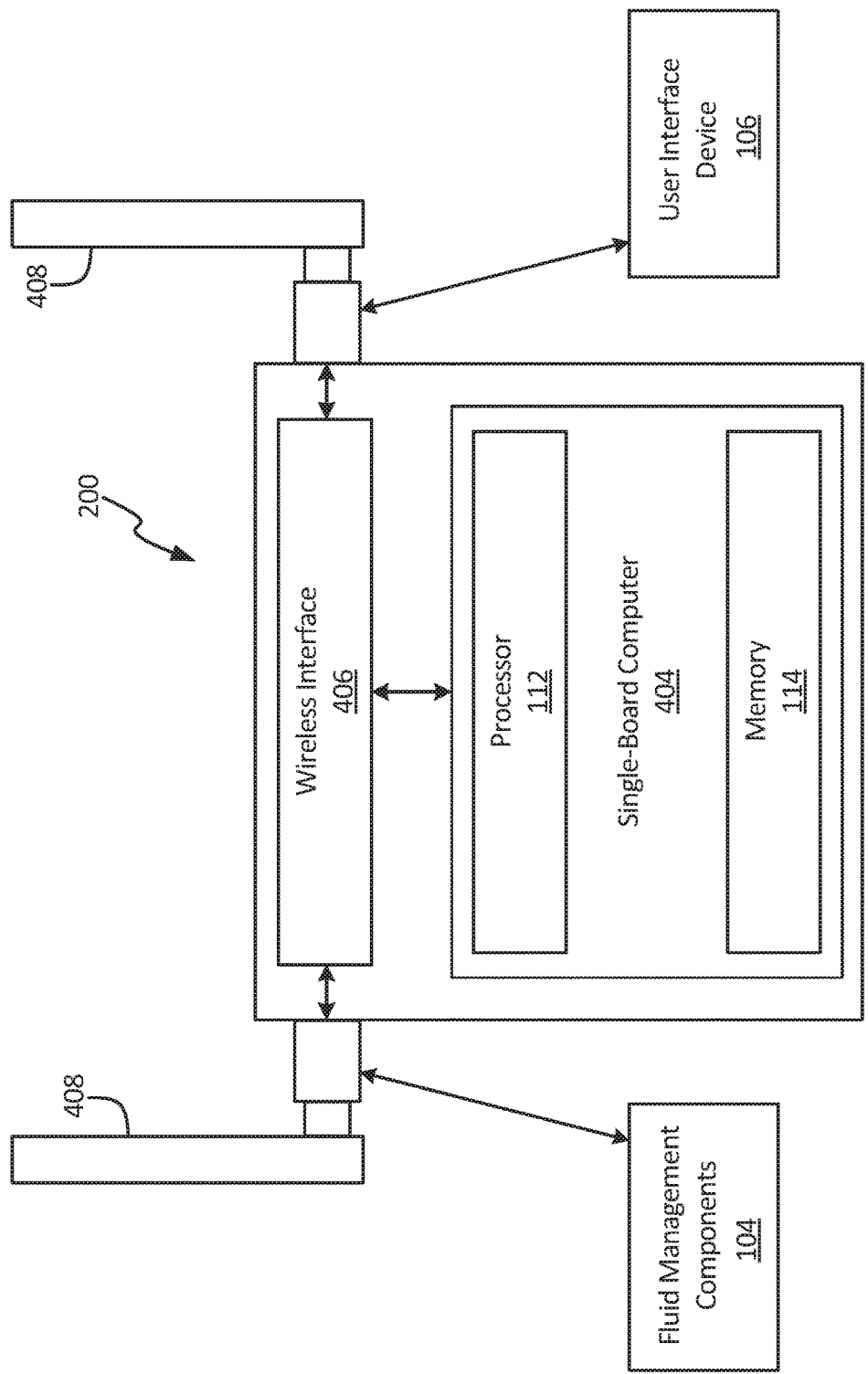
FIG. 4A is a schematic block diagram of a fluid management controller.
Figure 4B:
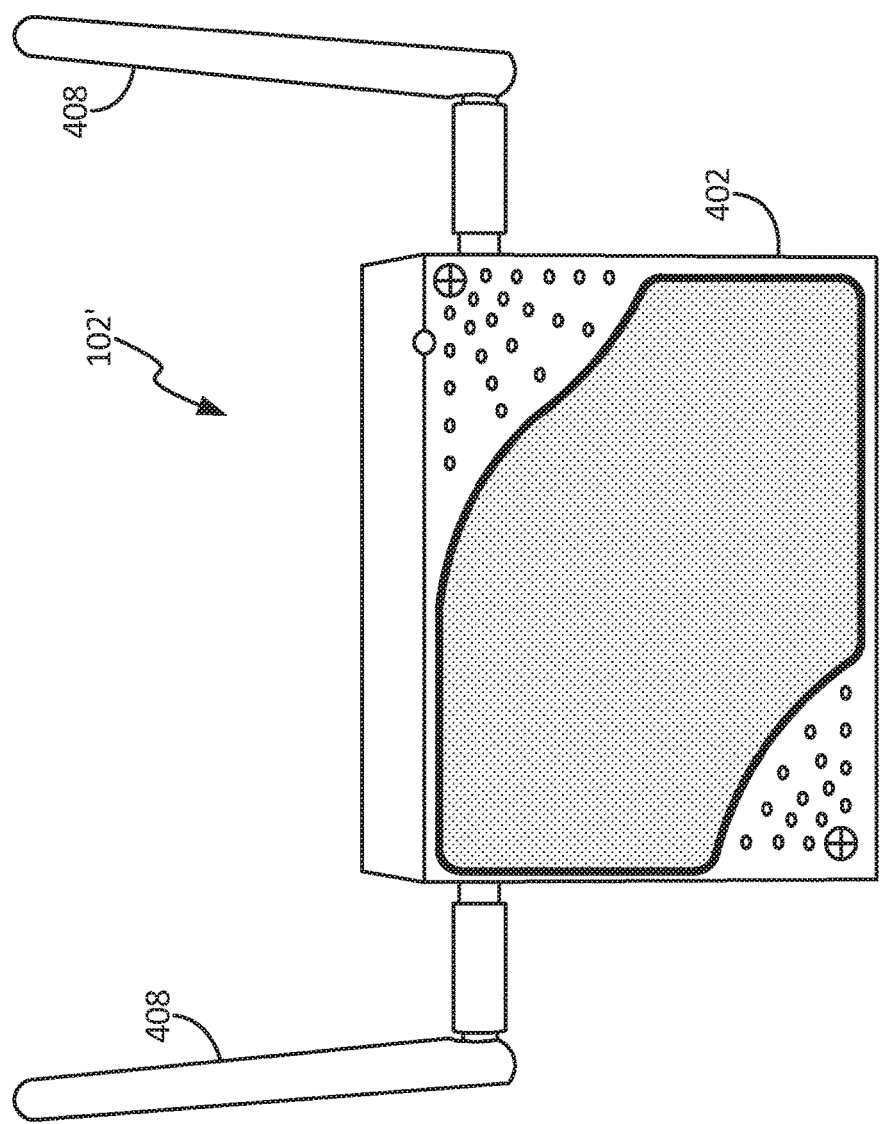
FIG. 4B is an isometric view of a fluid management controller.

FIG. 4A is a schematic block diagram of fluid management controller 102'. FIG. 4B is an isometric view of fluid management controller 102'. Fluid management controller 102' includes casing 402, single-board computer (SBC) 404, wireless interface 406, and antennas 408. Fluid management controller 102' is configured to wirelessly communicate with fluid management components 104 and user interface devices 106 over communication links 108 and 110. SBC 404 includes processor 112 and memory 114.

Fluid management controller 102' is protected by casing 402, which serves as an enclosure for SBC 404 and wireless interface 406. Casing 402 can include one or more pieces of bent sheet metal. In one example, casing 402 includes two pieces of bent sheet metal. SBC 404 and wireless interface 406 are connected and disposed within casing 402.

Wireless interface 406 and antennas 408 may form a transceiver, for example, that allows fluid management controller 102' to communicate wirelessly on communication links 108 and/or 110. Antennas 408 extend out from casing 402 and are configured to send and receive wireless signals to and from fluid management components 104 and/or user interface devices 106. Fluid management controller 102' can communicate on various bandwidths, such as 2.4 GHZ and 5 GHZ, for example. Additionally, fluid management controller 102' can communicate using cellular (e.g., LTE) bandwidths. Fluid management controller 102' can be configured to operate using any IEEE 802.11 standard, for example.

SBC 404, using processor 112 and wireless interface 406, can host a network, which includes communication links 108 and 110. In one example, the network hosted by fluid management controller 102' is a wireless personal area network (PAN) interconnecting components 104 and devices 106. It is understood, however, that fluid management controller 102' can communicate wirelessly over a local network, such as network 204 (shown in FIG. 2). The network allows fluid management controller 102' to wirelessly communicate with, and control, fluid management components 104. Fluid management controller 102' can authorize control of fluid management components 104 over the network. Fluid management controller 102' can generate and communicate HTML code such that a webpage is accessible by user interface devices 106 for accessing data stored in memory 114.

While memory 114 is described as located on dedicated SBC 404, it is understood that memory 114 can be disposed separate from SBC 404, such as where memory 114 is a removable memory card, for example. Memory 114 is encoded with instructions that, when executed by processor 112, cause fluid management controller 102' to communicate with and control fluid management components 104 and record information in memory 114. User interface devices 106 are configured to access the recorded information from memory 114 via communication link 110.

Figure 5A:
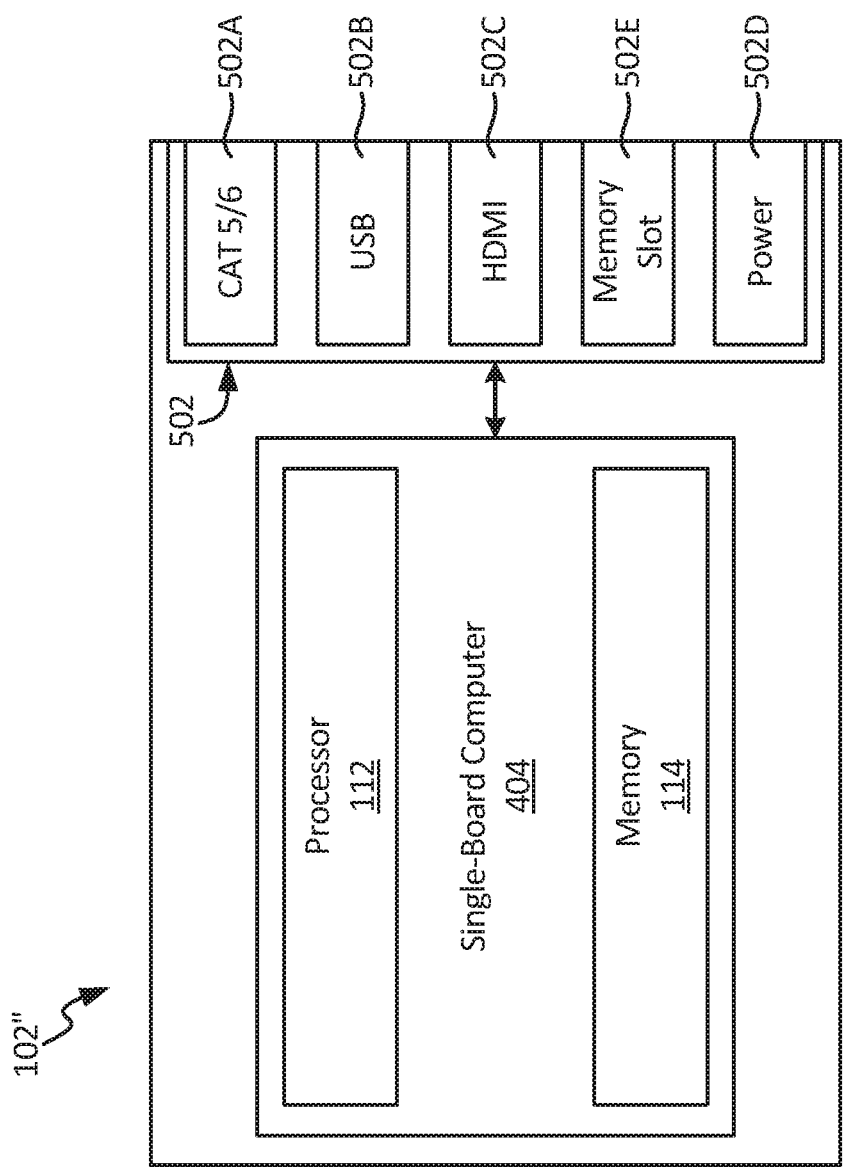
FIG. 5A is a schematic block diagram of a fluid management controller.
Figure 5B:
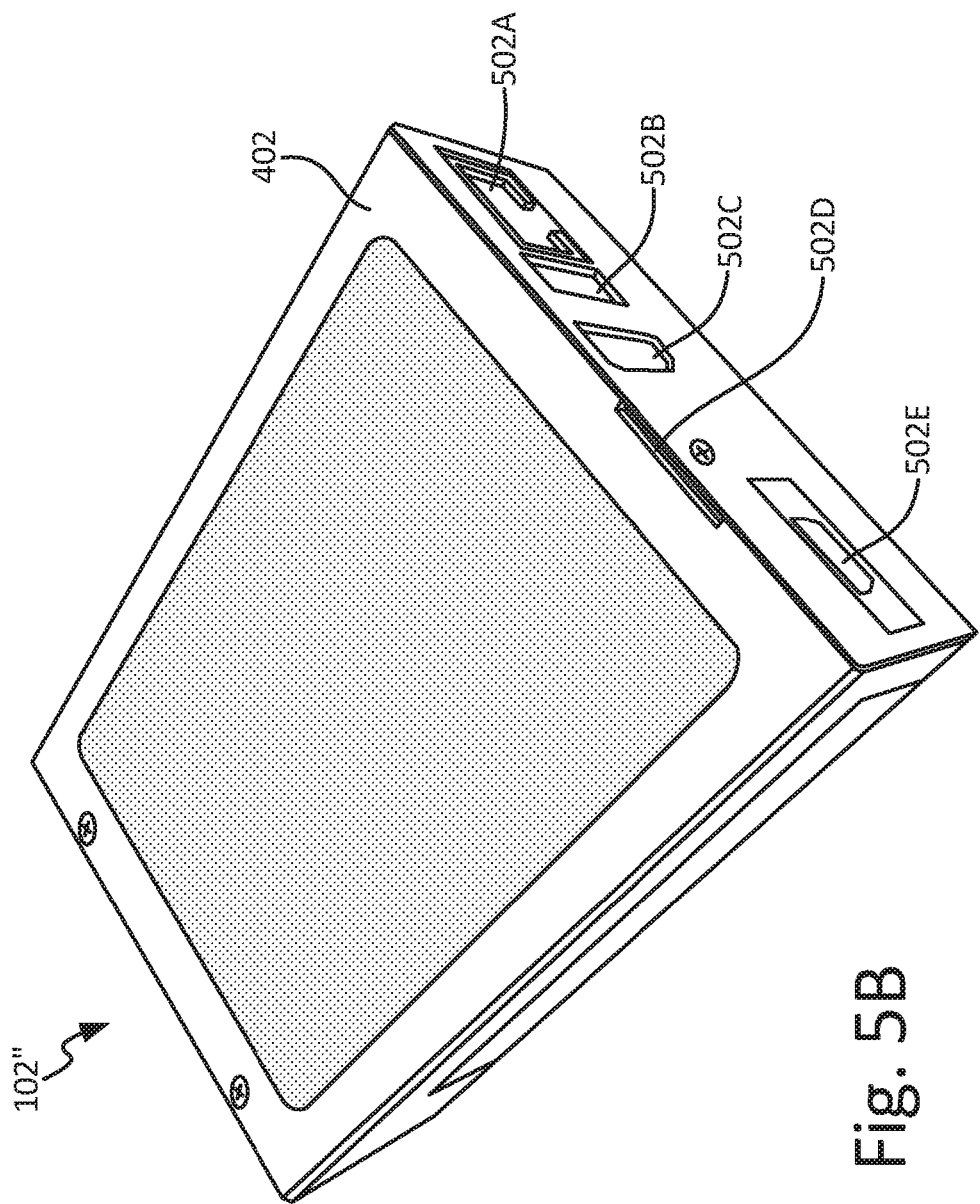
FIG. 5B is an isometric view of a fluid management controller.

FIG. 5A is a schematic block diagram of fluid management controller 102". FIG. 5B is an isometric view of fluid management controller 102". Fluid management controller 102" includes casing 402, SBC 404, and connectors 502. SBC 402 includes processor 112 and memory 114. Connectors 502 can include CAT 5/6 port 502A, universal system bus (USB) port 502B, high-definition multimedia interface (HDMI) port 502C, memory slot 502D, and power connection 502E.

Connectors 502 extend into casing 402 and are configured to receive various communications components. Connectors 502 provide fluid management controller 102" with wired communications capabilities. Memory slot 502C can connect to an external memory device, such as an external hard drive, flash drive, memory card, secure digital (SD) card, micro SD card, or other such device. CAT 5/6 port 502A is configured to receive an Ethernet cable to provide wired communications capabilities to fluid management controller 102". USB port 502B is configured to receive any desired USB interface device and can be used to load instructions to or download instructions from SBC 404. HDMI port 502C is configured to receive an HDMI cable.

Most aspects of fluid management controller 102" require an externally wired A/C power source connected to power connection 502E. It is understood, however, that various power sources can be connected to power connection 502E, such as a USB-connected device configured to provide power, a solar power panel, or a battery, among other options.

Connectors 502 provide power and wired communications capabilities to fluid management controller 102". The wired communications capabilities are supplemental to the wireless communications abilities described above. As such, fluid management controller 102" can communicate with, control, and record information wireles sly or via wired connections through connectors 502. Connectors 502 can connect fluid management controller 102" to fluid management components 104 (best seen in FIG. 1); user interface devices 106 (best seen in FIG. 1); and/or network 204 (shown in FIG. 2).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid management system comprising:
   plurality of fluid management components, the plurality of fluid management components including:
   a tank level monitor configured to monitor a fluid level of a fluid tank;
   a pump controller configured to control activation of a pump; and
   a dispensing meter;
   a user interface device; and
   a fluid management controller configured to communicate wirelessly with plurality of fluid management components, authorize the plurality of fluid management components to initiate a dispense event, and collect data received from each of the plurality of fluid management components;

wherein the fluid management controller is configured to receive log-in information from the dispensing meter and to compare the log-in information to work order information for the dispense event, wherein the work order information fluid type information and authorized user information;

wherein the fluid management controller is configured to authorize the plurality of fluid management components to initiate the dispense event based on the comparison between the log-in information and the work order information;

wherein the fluid management controller is further configured to collect fluid level data regarding the fluid level from the tank level monitor;

wherein the pump controller is configured to activate the pump in response to the fluid management controller initiating the dispense event; and wherein the fluid management controller is further configured to collect data regarding the dispense event from the dispensing meter.

2. The fluid management system of claim 1, further comprising:
a wireless network, wherein the fluid management controller is configured to communicate wirelessly with the plurality of fluid management components and the user interface device over the wireless network.

3. The fluid management system of claim 1, wherein the data regarding the dispense event collected from the dispensing meter includes at least one of an identity of a user completing the dispense event and a time of the dispense event.

4. The fluid management controller of claim 3, wherein the dispense data further includes a volume of fluid dispensed.

5. The fluid management system of claim 1, wherein the fluid management controller includes a processor, a memory, a wireless transceiver, and is contained within a single housing.

6. The fluid management system of claim 5, wherein the fluid management controller is configured to host a wireless personal area network that includes the plurality of fluid management components.

7. The fluid management system of claim 1, wherein the fluid management controller comprises:
a processor;
a wireless transceiver configured to enable wireless communication between the fluid management controller and the plurality of fluid management components; and
a computer readable memory encoded with instructions that, when executed by the processor, cause the fluid management controller to authorize at least one of the plurality of fluid management components to initiate a dispense event, and collect data received from the at least one of the plurality of fluid management component.

8. The fluid management controller of claim 7, further comprising:

a housing enclosing the processor, the computer readable memory, and at least a portion of the wireless transceiver.

9. The fluid management controller of claim 8, wherein the wireless transceiver includes at least one antenna external to the housing.

10. The fluid management controller of claim 7, further comprising a plurality of connectors selected from the group consisting of a wired network connector, a universal serial bus connector, a high-defmition multimedia interface connector, an external memory connector, and a power connector.

11. The fluid management controller of claim 7, wherein the processor and the computer readable memory are configured on a single circuit board.

12. A method comprising:
receiving, at a fluid management controller, log-in information from a dispensing meter;
comparing, by the fluid management controller, the log-in information with work order information, the work order information including fluid type information and authorized user information;
authorizing, by the fluid management controller, a first dispense event based on the comparison of the log-in information and the work order information, wherein authorizing includes activating, by the fluid management controller, a pump controller to thereby activate a pump, the pump driving fluid to the dispensing meter;
collecting, by the fluid management controller, first fluid data regarding the first dispense event from a plurality of fluid management components, the plurality of fluid management components including the pump controller, the dispensing meter, and a tank level monitor, wherein the fluid management controller is configured to communicate wirelessly with the plurality of fluid management components; and
providing access, by the fluid management controller, to the first fluid data by a user interface device.

13. The method of claim 12, wherein the first fluid data is stored in a memory of the fluid management controller, and wherein the method further comprises:
accessing, by the user interface device, the first fluid data from the memory of the fluid management controller through a web browser.

14. The method of claim 13, further comprising:
collecting, by the fluid management controller, second fluid data regarding a second dispense event from the at least one fluid management component.

15. The method of claim 14, further comprising:
aggregating, by the fluid management controller, the first fluid data and the second fluid data as aggregated data; and
providing access to the user interface device, by the fluid management controller, to the aggregated data.

16. The method of claim 15, further comprising:
transmitting, by the fluid management controller over a wireless network, the aggregated data to a local management system.

17. The method of claim 12, further comprising:
hosting, by the fluid management controller, a wireless personal area network that includes the at least one fluid management component.

* * * * *